Patented June 11, 1940

2,204,412

UNITED STATES PATENT OFFICE 2,204,412

WELD ROD

Josef Hinnüber, Essen, Germany, assignor to General Electric Company, a corporation of New York No Drawing. Application April 15, 1938, Serial No. 202,275. In Germany August 4, 1937

7 Claims. (Cl. 219—8)

My invention relates to hard facing alloys.

The excellent results obtained by the use of hard metals built up on the basis of tungsten carbide and similar carbides, for the manufacture of turning tools and drawing dies has given rise to the use of these hard metals also for hard facing work of various kinds, owing to the great hardness and high resistance to wear of these hard metals. So, for instance, in the deep boring industry fish tail bits have been studded with hard metal by applying sintered or melted hard metal nibs to the working surfaces of the bits or boring tools and embedding these nibs by welding thereonto a stellite-like alloy, i. e., an alloy which consists mainly of cobalt, some metals of the chromium group (chromium, tungsten, molybdenum) and carbon and in which part of the cobalt may be replaced by iron or nickel. In the use of the bit the embedding mass will wear more rapidly than the harder hard metal nibs so that they act like cutters and remove the earth. This method, however, gives no satisfactory results in studding small surfaces and in armoring the cutting points and cutting edges of drilling bits, because serious difficulties are encountered in the fixation of the carbide nibs to such small surfaces. To overcome these difficulties another method is employed which consists in preparing weld rods composed of an embedding mass and hard metal particles and applying this composition to the tool to be armored. In this manner the embedding mass and the carbide particles are fixed simultaneously to the surface to be studded and the difficulties are avoided which arise in depositing first the carbide particles and subsequently welding thereover the embedding mass.

My invention has for its object hard facing alloys which differ from the composite welding material hereinbefore mentioned in that they are prepared by sintering and contain the hard metal particles in such a dispersion that the weld becomes practically homogeneous. The expression "hard metal" as employed in the present specification and claims refers to a melted or sintered hard metal which, as hereinafter pointed out, consists of tungsten carbide or of another carbide or mixtures of hard carbide either with or without the addition of metal of the iron group. By preparing the alloys by sintering the possibility is afforded of giving the embedding mass a composition of any desired nature and grain fineness which by a melting process can be obtained only difficultly or not at all owing to melting losses and liquation. The sintering method affords the further advantage that it is not difficult to achieve a very uniform distribution of the hard metal particles within the mass by mixing the powdered starting materials of the mass with the hard metal particles and sintering the mixture, since no decomposition or liquation takes place by the sintering operation. This feature is of decisive significance in studding vital parts of machinery, such as valve seats, where a homogeneous weld is a sine qua non condition. Furthermore, the application of a reducing atmosphere, for example, a hydrogenous atmosphere normally employed in sintering operations, has the effect that my new hard facing alloys when produced by a sintering process and are free of oxides and, consequently, in welding show better flowing properties and give a denser weld than alloys produced by a fusing process. It is to be taken into consideration, further, that studding of those parts of machinery is difficult which in service are exposed to heat variations and shock stresses, unless the heat expansion of the weld is adapted to that of the ground material. In using sintered weld material this adaptation is obtained more easily than in using fused material, for the reasons hereinbefore explained.

Shaping of my new hard facing alloys may be carried on in various ways according to the special purpose they are intended for and to their composition. For example, the mixture of the powdered starting materials may be poured into suitable moulds and sintered in an electric short-circuit furnace or high-frequency furnace, or the starting mixture may be wetted with an organic binder, such as vegetable oil, and pressed in a known manner into bars which subsequently are sintered.

Finally, my invention affords a remarkable advantage in economical respects when compared with alloys produced by fusing and casting, since notably lower temperatures are employed in the sintering process than in the fusing process.

The hard metal particles are added to the starting mixture forming the embedding mass preferably in a proportion of from 20 to 70 percent. They may be produced by preparing a hard metal which for example may consist of tungsten carbide or any other suitable hard carbide or cemented carbides such as mixtures of hard carbides, with or without addition of a metal or metals of the iron group, viz., iron, cobalt, nickel, crushing thereupon the hard material, and screening it through a sieve of at least 300 meshes/cm$^2$.

The deposition of the new hard facing alloys may be effected either by arc welding or gas welding. In the former case I prefer to suitably coat the weld material.

A preferred method of preparing an alloy according to the present invention may be given in the following by way of example:

27 shares powdered iron, 16 shares powdered ferrochrome, 3.2 shares powdered ferromanganese, 1.5 shares powdered ferrosilicon, and 2.3 shares powdered carbon are mixed with a fine powdered tungsten carbide sinter alloy. The mixture is pressed into bars which then are sintered in the carbon tube short-circuit furnace.

The expression "sintered metallic mass" as employed in the specification and claims refers to a sintered mass which consists of at least one metal of the iron group (iron, nickel, cobalt, manganese) either alone or with at least one metal of the chromium group (chromium, tungsten, molybdenum) as well as in certain cases a small quantity of carbon.

What I claim and desire to secure by Letters Patent is:

1. A sintered weld rod adapted to be applied to the cutting edge of a drill bit, said rod being made of 27 parts powdered iron, 16 parts ferrochrome, 3.2 parts powdered ferromanganese, 1.5 parts powdered ferrosilicon, 2.3 parts powdered carbon and 50 parts of fine powdered presintered "hard metal," said "hard metal" consisting principally of tungsten carbide.

2. A weld rod consisting of a sintered embedding mass in which presintered or cast "hard metal" particles are embedded.

3. A weld rod consisting of an embedding sintered alloy in which presintered "hard metal" particles are uniformly distributed, said particles having a higher degree of hardness than said alloy.

4. A weld rod consisting of a hard embedding sintered alloy in which presintered "hard metal" particles are uniformly distributed, said hard particles consisting principally of one or more sintered carbides.

5. A weld rod consisting of a hard embedding sintered alloy in which presintered "hard metal" particles are uniformly distributed, said hard particles consisting principally of sintered tungsten carbide.

6. A weld rod consisting of a hard embedding sintered alloy in which presintered "hard metal" particles are uniformly distributed, said hard particles consisting of one or more cemented carbides.

7. A weld rod consisting of a hard embedding sintered alloy having "hard metal" particles distributed therethrough, said hard particles consisting principally of presintered or cast tungsten carbide and being capable of passing through a wire mesh screen having at least 300 meshes per cm.$^2$.

JOSEF HINNÜBER.